United States Patent
Lim et al.

(10) Patent No.: US 10,490,783 B2
(45) Date of Patent: Nov. 26, 2019

(54) POUCH-TYPE SECONDARY BATTERY AND METHOD FOR MANUFACTURING THE SAME

(71) Applicant: LG Chem, Ltd., Seoul (KR)

(72) Inventors: Seong-Yoon Lim, Daejeon (KR); Jung-Seok Choi, Daejeon (KR)

(73) Assignee: LG Chem, Ltd. (KR)

( * ) Notice: Subject to any disclaimer, the term of this patent is extended or adjusted under 35 U.S.C. 154(b) by 413 days.

(21) Appl. No.: 15/308,745

(22) PCT Filed: Mar. 7, 2016

(86) PCT No.: PCT/KR2016/002258
§ 371 (c)(1),
(2) Date: Nov. 4, 2016

(87) PCT Pub. No.: WO2016/175444
PCT Pub. Date: Nov. 3, 2016

(65) Prior Publication Data
US 2017/0194606 A1  Jul. 6, 2017

(30) Foreign Application Priority Data
Apr. 29, 2015  (KR) .................. 10-2015-0060852

(51) Int. Cl.
| | |
|---|---|
| *H01M 2/02* | (2006.01) |
| *H01M 2/04* | (2006.01) |
| *H01M 2/18* | (2006.01) |
| *H01M 2/34* | (2006.01) |
| *H01M 10/04* | (2006.01) |
| *H01M 10/058* | (2010.01) |

(52) U.S. Cl.
CPC ........... *H01M 2/0456* (2013.01); *H01M 2/02* (2013.01); *H01M 2/0212* (2013.01); *H01M 2/04* (2013.01); *H01M 2/18* (2013.01); *H01M 2/345* (2013.01); *H01M 10/04* (2013.01); *H01M 10/058* (2013.01)

(58) Field of Classification Search
CPC ........ H01M 2/02; H01M 2/0212; H01M 2/04; H01M 2/0456; H01M 2/18; H01M 2/345; H01M 10/04; H01M 10/058
See application file for complete search history.

(56) References Cited

U.S. PATENT DOCUMENTS

| | | | |
|---|---|---|---|
| 2005/0112461 A1 | 5/2005 | Amine et al. | |
| 2006/0269831 A1* | 11/2006 | Kim | H01M 2/021 429/62 |
| 2010/0310930 A1 | 12/2010 | Park et al. | |
| 2011/0244315 A1* | 10/2011 | Yoon | H01M 2/0207 429/176 |
| 2012/0183706 A1* | 7/2012 | Kang | H01M 2/0275 428/29 |
| 2012/0299555 A1 | 11/2012 | Tam et al. | |
| 2014/0099535 A1 | 4/2014 | Chu | |
| 2015/0056498 A1 | 2/2015 | Jo et al. | |

FOREIGN PATENT DOCUMENTS

| | | |
|---|---|---|
| JP | 2000251854 A | 9/2000 |
| JP | 200495401 A | 3/2004 |
| JP | 2004179090 A | 6/2004 |
| JP | 2007265879 A | 10/2007 |
| KR | 20100099063 A | 9/2010 |
| KR | 20120069319 A | 6/2012 |
| KR | 20130070624 A | 6/2013 |
| KR | 20140059650 A | 5/2014 |
| KR | 20150022214 A | 3/2015 |

OTHER PUBLICATIONS

Machine translation of JP 2000-251854, published on Sep. 14, 2000 (Year: 2000).*
Machine translation of JP 2007-265879, published on Oct. 11, 2007 (Year: 2007).*
International Search Report from PCT/KR2016/002258, dated Sep. 5, 2016.
Supplementary European Search Report for Application No. EP16786631 dated Nov. 3, 2017.

* cited by examiner

*Primary Examiner* — Anca Eoff
(74) *Attorney, Agent, or Firm* — Lerner, David, Littenberg, Krumholz & Mentlik, LLP

(57) ABSTRACT

Disclosed is a pouch-type secondary battery, which prevents a metal layer made of a lamination sheet from being exposed outwards, and a method for manufacturing the same. The pouch-type secondary battery includes a pouch-type battery case; an electrode assembly mounted in the battery case; electrode leads of a positive electrode and a negative electrode, configured to have one end connected to the electrode assembly and the other end protruding out of the battery case; and a sealing portion configured to bond an upper sheet and a lower sheet of the battery case, wherein a tape having a metal foil is bonded to increase a moisture penetration path toward a terminal of the sealing portion.

13 Claims, 8 Drawing Sheets

FIG. 1

<RELATED ART>

POUCH-TYPE SECONDARY BATTERY AND METHOD FOR MANUFACTURING THE SAME

CROSS-REFERENCE TO RELATED APPLICATION

This application is a national phase entry under 35 U.S.C. § 371 of International Application No. PCT/KR2016/002258, filed Mar. 7, 2016, which claims priority to Korean Patent Application No. 10-2015-0060852, filed Apr. 29, 2015, the disclosures of which are incorporated herein by reference.

TECHNICAL FIELD

The present disclosure relates to a pouch-type secondary battery and a method for manufacturing the same, and in particular, to a pouch-type secondary battery having an improved sealing portion and a method for manufacturing the same.

BACKGROUND ART

Generally, a secondary battery is a rechargeable battery, different from a primary battery which cannot be charged, and the secondary battery is widely used for electronic devices such as cellular phones, notebooks and camcorders, and electric vehicles (EV). In particular, a lithium secondary battery with an operating voltage of about 3.6V tends to be used more and more due to a greater capacity in comparison to a nickel-cadmium battery or a nickel-hydrogen battery frequently used as a power source of an electronic device, and a high energy density per unit weight.

A lithium secondary battery generally uses a lithium-based oxide and a carbon material as a positive electrode active material and a negative electrode active material, respectively. The lithium secondary battery includes an electrode assembly in which a positive electrode plate and a negative electrode plate respectively coated with the positive electrode active material and the negative electrode active material are disposed with a separator being interposed therebetween, and an exterior material, namely a battery case, configured to accommodate and seal the electrode assembly together with an electrolyte. The lithium secondary battery may be classified into a can-type secondary battery in which an electrode assembly is included in a metal can and a pouch-type secondary battery in which an electrode assembly is included in a pouch made of an aluminum lamination sheet, depending on the shape of the battery case.

The pouch-type secondary battery is classified into a unidirectional battery in which electrode leads connected to positive/negative electrode tabs of a secondary battery are exposed at one side and a bidirectional battery in which the electrode leads are exposed oppositely. Here, the bidirectional battery is configured as shown in FIG. 1.

Figure 1:
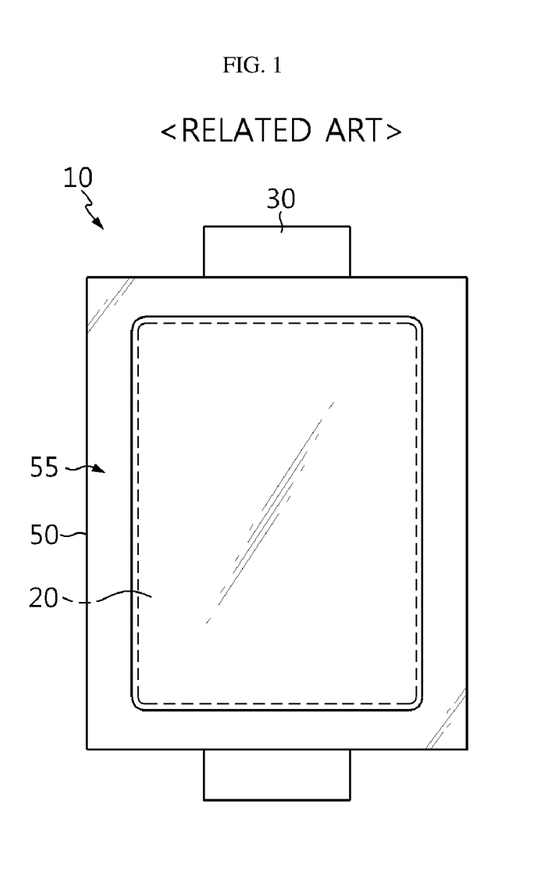
FIG. 1 is a plane view showing an existing pouch-type secondary battery.

The pouch-type secondary battery 10 depicted in FIG. 1 includes an electrode assembly 20, electrode leads 30, 40, and a pouch-type battery case 50. Reference symbol "55" represents a sealing portion thermally bonded.

The battery case 50 has a laminate structure of an outer resin layer, a metal layer and an inner resin layer, so that both side portions, an upper end portion and a lower end portion where upper and lower pouches contact each other may be bonded to each other by heating and pressing them to fuse resin layers to each other. Both side portions may be uniformly sealed by means of fusing since the same resin layers of the upper and lower pouches come into direct contact with each other. Meanwhile, since the electrode leads 30, 40 protrude at the upper end portion and the lower end portion, the upper end portion and the lower end portion are thermally bonded in a state where a film-type sealing material is interposed between the electrode leads 30, 40 to enhance a sealing property, in consideration of the thickness of the electrode leads 30, 40 and a difference in material with the battery case 50.

However, since the electrode assembly 20 of the pouch-type secondary battery 10 repeats expanding and shrinking during a charging and discharging process, the thermally bonded portions at the upper end portion and the lower end portion, particularly at both side portions, may be easily separated. If a high pressure occurs inside the battery due to degradation caused by long-term use or abnormal operation conditions, the thermally bonded sealing portion may be opened, which may result in leakage of gas, electrolyte or the like in the battery. The electrolyte is made of a combustible material and thus has a high risk of firing.

Further, even though the battery case 50 having a laminate structure is sealed by means of thermal bonding, a cutting plane of the sealing portion made of a lamination sheet (namely, a cutting plane of the sheet) is exposed outwards, and thus external moisture, air or the like may penetrate into the secondary battery through the sealing portion.

A moisture penetration rate has a relation with time and temperature and is increasing if temperature and humidity at an environment around the secondary battery are higher. Moisture or the like penetrating through the cutting plane of the sealing portion made of a lamination sheet reacts with the electrolyte to form gas and also promote degradation of the secondary battery by means of destruction of the positive electrode material or the like, which is not desirable in view of safety and life characteristics. In other words, the pouch-type secondary battery currently used in the art has a weak structure against external environments since the cutting plane of the sealing portion of the pouch is exposed outwards.

To solve this problem, a sealing width may be designed wider to protect the secondary battery, which however is contradictory to the current trend of the related art, which is directed to higher density, and thus it is required to design the sealing width as small as possible in order to enhance space utilization of the secondary battery.

DISCLOSURE

Technical Problem

The present disclosure is designed to solve the problems of the related art, and therefore the present disclosure is directed to providing a pouch-type secondary battery and a method for manufacturing the same, which may solve a problem that moisture penetrates through a cutting plane of a sealing portion.

Technical Solution

In one aspect of the present disclosure, there is provided a pouch-type secondary battery, comprising: a pouch-type battery case; an electrode assembly mounted in the battery case; electrode leads of a positive electrode and a negative electrode, configured to have one end connected to the electrode assembly and the other end protruding out of the battery case; and a sealing portion configured to bond an upper sheet and a lower sheet of the battery case, wherein a tape having a metal foil is bonded to increase a moisture penetration path toward a terminal of the sealing portion.

The tape may be bonded to the sealing portion to cover a surface of the upper sheet and a surface of the lower sheet so that a terminal of the sealing portion (a cutting plane) is not exposed.

The metal foil may be an aluminum foil.

The tape may be composed of an adhesive layer and a metal foil layer. In addition, the tape may further include an insulation layer on the metal foil layer. The insulation layer may include at least one polymer selected from the group consisting of polyethylene terephthalate, nylon, polyethylene and polypropylene. The adhesive layer may have a thickness of 5 um to 100 um, and the metal foil layer may have a thickness of 5 um to 100 um. 1 to 10% by mass of moisture-absorbing material may be included in the adhesive layer.

In an embodiment, the upper sheet and the lower sheet may be respectively composed of an outer resin layer, a metal layer and an inner resin layer, and the outer resin layer is patterned in the sealing portion. The tape may be bonded while filling an unevenness of the patterned outer resin layer. The outer resin layer may be patterned in parallel to the terminal of the sealing portion. A distance between the patterns of the outer resin layer may be 1.5 to 50 times of the thickness of the tape. In addition, the tape may be composed of an adhesive layer, a metal foil layer and an insulation layer, the metal foil layer may have a thickness of 5 um to 20 um, the adhesive layer and the insulation layer may respectively have a thickness of 5 um to 30 um, and a crystallinity of polymers of the adhesive layer and the insulation layer may be 30% or below. At this time, the adhesive layer and the insulation layer may be made of thermally shrinkable material. The thermally shrinkable material may be at least one selected from the group consisting of polypropylene, polyethylene and polyvinyl chloride.

In another embodiment, the tape may be bonded in a state where the sealing portion is repeatedly bent.

The present disclosure also provides a method for manufacturing a secondary battery as above.

In the method for manufacturing secondary battery, the outer resin layer may be prepared in a patterned state, or before the step of bonding the tape, a step of patterning the outer resin layer to the sealing portion may be further included.

The step of patterning the outer resin layer may be performed by melting the outer resin layer while the sealing portion is being formed. At this time, the outer resin layer may be bonded while being pressed using a press having an unevenness when the sealing portion is formed, so that the outer resin layer is sealed and patterned simultaneously.

The outer resin layer may be patterned after the sealing portion is formed. At this time, the outer resin layer may be patterned by performing wet etching or dry etching using an etchant capable of fusing a polymer of the outer resin layer or by burning the polymer with a laser beam.

After the tape is bonded, the method may further include performing an additional treatment so that the tape fills an unevenness between patterns of the outer resin layer, after.

After the tape is bonded, the method may further include pressing or heating a portion where the tape is bonded. The press may have a temperature in the range of room temperature to 80° C., and a surface of the press which comes into contact with the tape may be an uneven surface having a convex portion in a region corresponding to a valley between patterns of the outer resin layer and a concave portion in a region corresponding to a pattern of the outer resin layer. In particular, a surface of the press which comes into contact with the tape may be made of a polymer material with elasticity.

Advantageous Effects

According to the present disclosure, a moisture penetration path may be elongated with the same sealing width, and thus stability and durability of a secondary battery may be greatly improved.

In the present disclosure, a terminal of the sealing portion is designed not to be exposed, in a simple way by means of tape adhesion. For example, if a metal is welded to a terminal of a pouch to block moisture penetration, an outer resin layer serving as an outer surface of the pouch should be removed and a new metal foil part should be added and welded at high temperature, which may not be easily applied to practical mass production. However, in the present disclosure, an existing pouch-type secondary battery may be applied in a simple way without any structural change, by means of tape adhesion, which ensures easy application of processes and allows mass production.

According to the present disclosure, by solving the problem that moisture penetrates into a sealing portion of a pouch-type secondary battery, various problems caused therefrom may also be solved, thereby improving long-term storage of the secondary battery and battery performance.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Since the performance of a secondary battery does not deteriorate even though moisture penetrates to some extent, a present problem may be solved if a moisture penetration path is simply elongated with the same sealing width.

Figure 2:
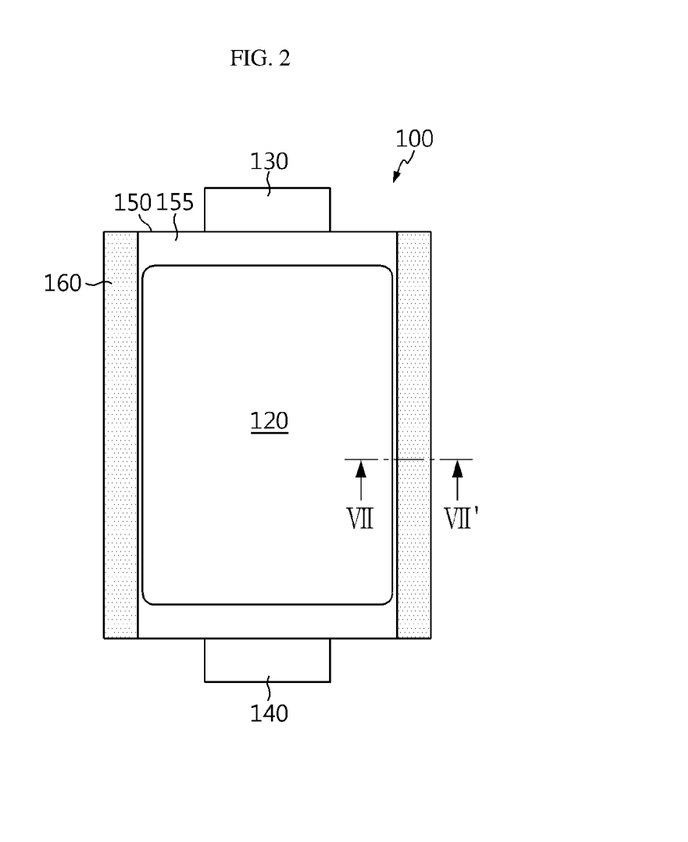
FIG. 2 is a top view showing a pouch-type secondary battery according to the present disclosure.
Figure 3:
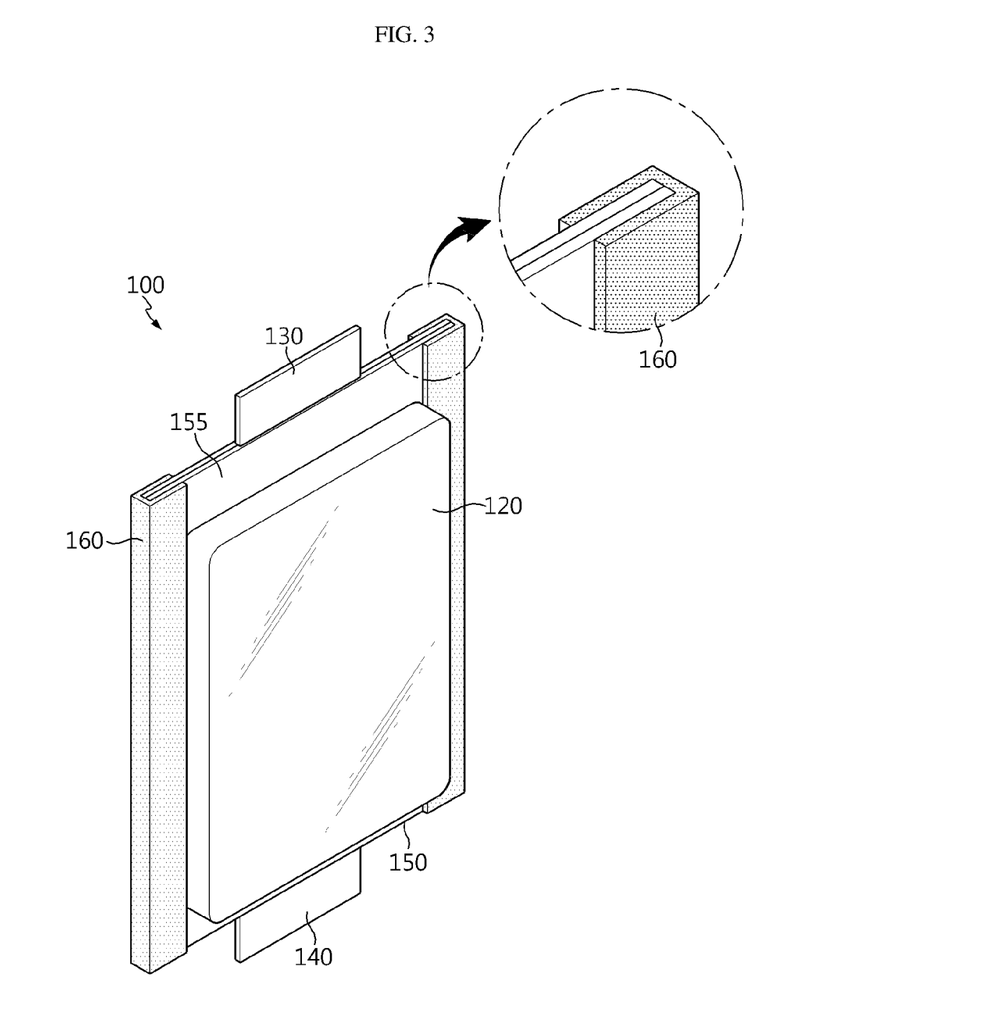
FIG. 3 is a perspective view thereof.

FIG. 2 is a top view showing a pouch-type secondary battery according to the present disclosure, and FIG. 3 is a perspective view thereof.

Referring to FIGS. 2 and 3, a pouch-type secondary battery 100 according to the present disclosure includes an electrode assembly 120, electrode leads 130, 140, a pouch-type battery case 150, and a tape 160 having a metal foil.

Though not depicted in detail for convenience, the electrode assembly 120 includes at least one positive electrode plate and at least one negative electrode plate, which are arranged with a separator being interposed therebetween, and is accommodated in the battery case 150. At this time, the electrode assembly 120 may be accommodated in the battery case 150 in a state where a plurality of positive electrode plates and a plurality of negative electrode plates are stacked or may be accommodated in the battery case 150 in a state where a single positive electrode plate and a single negative electrode plate are wound. The electrode assembly 120 may be a winding-type, a stacking-type or a stacking/folding-type electrode assembly.

The electrode plates of the electrode assembly 120 are formed by coating active material slurry to a current collector made of aluminum (Al) or copper (Cu), and the slurry may be generally formed by stirring in a state where a granular active material, an auxiliary conductor, a binder and a plasticizer are added to a solvent. In addition, each electrode plate may have an uncoated portion not coated with the slurry, and an electrode tab corresponding to each electrode plate may be formed in the uncoated portion.

The positive electrode active material may employ a chalcogenide compound to allow intercalation/deintercalation of lithium ions, and for example, maybe formed using composite metal oxides such as $LiCoO_2$, $LiMn_2O_4$, $LiNiO_2$, $LiNi_{1-x}Co_xO_2$ ($0<x<1$), $LiMnO_2$ or the like. The negative electrode active material may also be formed with carbon (C)-based material, silicon (Si), tin (Sn), tin oxide, tin alloy composite, transition metal oxide, lithium metal nitride, or lithium metal oxide so as allow intercalation/deintercalation of lithium ions.

The separator may be interposed between the positive electrode plate and the negative electrode plate to prevent a short which may occur between the positive electrode plate and the negative electrode plate, and the separator just allows movement of only lithium ions. The separator may be formed with a thermoplastic resin such as polyethylene (PE), or polypropylene (PP), and its surface may have a porous structure.

The electrode tabs (not shown) are composed of a positive electrode tab and a negative electrode tab, and respectively formed to protrude from the electrode assembly 120. In other words, the positive electrode tab is formed to protrude from the positive electrode plate of the electrode assembly 120, and the negative electrode tab is formed to protrude from the negative electrode plate of the electrode assembly 120. At this time, the positive electrode tab or the negative electrode tab may be formed to protrude in a form of being attached to the positive electrode plate or the negative electrode plate, and may be made of the same material as the positive electrode current collector or the negative electrode current collector, respectively.

A plurality of electrode tabs may be provided at a single electrode assembly. For example, a plurality of positive electrode tabs may be provided at the positive electrode plate, and a plurality of negative electrode tabs may be provided at the negative electrode plate. In this case, the plurality of positive electrode tabs may be connected to a single positive electrode lead 130, and the plurality of negative electrode tab may be connected to a single negative electrode lead 140. However, the present disclosure is not limited to this embodiment, and a single positive electrode tab and a single negative electrode tab may also be provided at a single electrode assembly.

In this embodiment, the positive electrode tab and the negative electrode tab protrude in opposite directions on the basis of the electrode assembly 120. The electrode leads 130, 140 are thin plate-like metals, whose one end is attached to the electrode tab and the other end is exposed out of the battery case 150. Namely, the secondary battery 100 according to the present disclosure is a bidirectional battery.

In other words, at one surface of the electrode assembly 120 and the other surface opposite thereto, a first electrode lead, namely the positive electrode lead 130 of this embodiment, and a second electrode lead, namely the negative electrode lead 140 of this embodiment, protrude in opposite directions.

The electrode leads 130, 140 may be attached to an upper portion or a lower portion of the electrode tab. The positive electrode lead 130 and the negative electrode lead 140 may be made of different materials. In other words, the positive electrode lead 130 may be made of, for example, aluminum, identical to the positive electrode plate, and the negative electrode lead 140 may be made of, for example, copper or nickel (Ni)-coated copper, identical to the negative electrode plate.

The battery case 150 has an inner space of a concave shape, and the electrode assembly 120 is accommodated in the inner space, which is then filled with a liquid, solid or gel electrolyte (not shown) depending on the kind of the secondary battery 100.

In this embodiment, the battery case 150 may be in the form of an aluminum pouch in which a metal layer (an aluminum foil) is interposed between an outer resin layer (an insulation layer) and an inner resin layer (an adhesive layer).

The insulation layer of the polymer material should have excellent tolerance against external environments in order to play a role of protecting the battery against the outside, and thus demands excellent tensile strength and weatherproof property in comparison to its thickness. For example, a polyester-based resin such as polyethylene terephthalate (PET), polyethylene naphthalate (PEN) or the like, a polyolefin-based resin such as polyethylene, polypropylene or the like, a polystyrene-based resin such as polystyrene, a polyvinyl chloride-based resin, a polyvinylidene chloride-based resin, or the like may be used. Such materials may be used solely or as a mixture of at least two of them. Here, polyethylene terephthalate and polyethylene naphthalate are preferred.

The aluminum foil plays a role of a substrate for maintaining mechanical strength and a barrier layer for preventing penetration of moisture and oxygen. In order to improve strength of the battery case in addition to preventing introduction or leakage of impurities such as gas and moisture, aluminum or aluminum alloy may be used, and the aluminum alloy may employ AA numbers 8079, 1N30, 8021, 3003, 3004, 3005, 3104, 3105 or the like, which may be used alone or as a mixture of at least two of them. Among them, AA numbers 8079, 1N30, 8021 and 3004 may be particularly preferred as a barrier layer.

The adhesive layer is also called a thermally bonding layer and may play a role of a sealant with a thermal bonding property. The adhesive layer may be made of a polyolefin-based resin. As the polyolefin-based resin layer, casted polypropylene (CPP) is frequently used. In addition, the adhesive layer may be made of a polyolefin-based resin selected from the group consisting of polypropylene chloride, polyethylene, ethylene propylene copolymer, polyethylene and acrylate copolymer, and polypropylene and acrylate copolymer, without being limited thereto.

The entire pouch generally has a thickness of 40 μm to 120 μm, the insulation layer and the adhesive layer preferably have a thickness of 10 μm to 40 μm, and the aluminum foil preferably has a thickness of 20 μm to 100 μm, without being limited thereto. If the thickness is too small, a barrier property between the inside and the outside of the battery case 150 deteriorates and the strength is lowered, undesirably. If the thickness is too great on the contrary, processing ability deteriorates, and the thickness and weight of the battery case 150 increase.

The battery case 150 may be composed of an upper sheet and a lower sheet. In addition, the space in which the electrode assembly 120 may be accommodated may be formed in any one of the upper sheet and the lower sheet, or both in the upper sheet and the lower sheet. Meanwhile, if the electrode assembly 120 is accommodated in the inner space of the upper sheet and the lower sheet, the upper sheet and the lower sheet are adhered by means of thermal bonding or the like, thereby forming a sealing portion 155. In addition, a tape 160 is bonded to the sealing portion 155. The tape 160 blocks a terminal of the sealing portion 155 not to be exposed outwards and includes a metal foil.

In this embodiment, the tape 160 is bonded to the sealing portion 155 at both sides where the upper sheet and the lower sheet of the battery case 150 come into contact with each other. The tape 160 is shaped corresponding to the sealing portion 155 so as to be located only at the sealing portion 155 of the upper sheet or the lower sheet and not to be located in other regions, for example a space where the electrode assembly 120 is accommodated. Since the tape 160 is formed according to the shape of the sealing portion 155, the tape 160 may be very easily bonded to the sealing portion 155. Therefore, it is possible to reduce complexity of a secondary battery manufacturing process, caused by including the tape 160. However, the tape 160 of the present disclosure is not limited to the above shape but may be formed with various shapes as described in the following embodiments.

A method for manufacturing the secondary battery 100 will be described briefly.

First, the upper or lower surface of one end of the electrode tab of the electrode assembly 120 and the lower or upper surface of one end of each the electrode leads 130, 140 are overlapped and attached to each other by means of ultrasonic welding or the like (Step s1).

After that, the electrode assembly 120 is accommodated so that the other end of the electrode leads 130, 140 extends out of the battery case 150. Then, an electrolyte is injected into the battery case 150, and the sealing portion 155 of the battery case 150 is formed by means of thermal bonding (Step s2). On occasions, thermal bonding may be performed first to seal regions other than an electrolyte injecting portion, and then after an electrolyte is injected, the electrolyte injecting portion may be sealed.

Finally, the tape 160 is bonded to the terminal of the sealing portion 155 to complete adhering (Step s3). In order to bond the tape 160 to the terminal of the sealing portion 155, a worker may cut the tape 160 by a suitable length by hands, place the tape 160 to the sealing portion 155 and then bond the tape 160 thereto. In other case, a dedicated device may be prepared and used for bonding the tape 160 to the sealing portion 155. If such a dedicated device is used, the tape 160 may be accurately cut as much as the length of the sealing portion 155, and the tape 160 may entirely cover the sealing portion 155.

Processes for aging, charging and discharging, forming, degasing or the like for the secondary battery may be performed between Steps s2 and s3, or after Step s3.

As described above, the present disclosure has a distinctive feature in that the tape 160 is bonded to the terminal of the sealing portion 155. The tape may be bonded to the terminal of the sealing portion of the pouch-type secondary battery in various ways, as shown in FIGS. 4 to 6.

Figure 4:
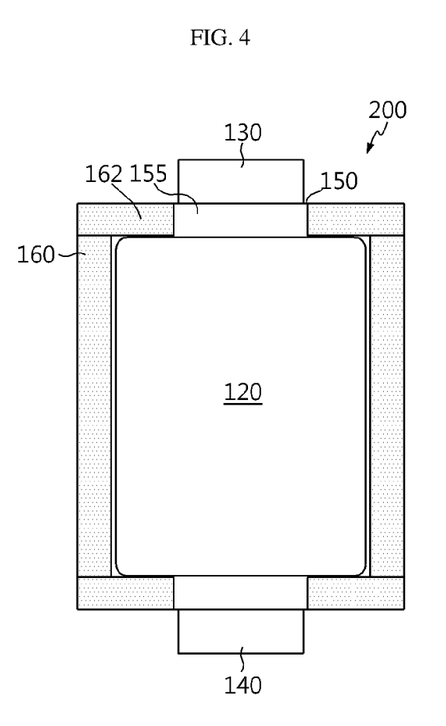
FIGS. 4 to 6 are top views showing a pouch-type secondary battery according to other embodiments of the present disclosure.

The pouch-type secondary battery 200 depicted in FIG. 4 includes an additional tape 162 bonded to the sealing portion 155 at upper and lower ends where the electrode leads 130, 140 protrude, in comparison to the pouch-type secondary battery 100 depicted in FIG. 2. After the tape 160 is firstly bonded to the sealing portions 155 at both sides as shown in FIG. 2, the tape 162 may be additionally bonded thereon. As another example, the tape 160 and the tape 162 may not be bonded separately but bonded integrally to the sealing portions at both sides and both upper and lower ends. The tape 160 and the tape 162 are bonded to regions except for regions where the electrode leads 130, 140 are located.

If the sealing portion 155 has various widths depending on its location, the tape 160 and the tape 162 may also have different widths. For this, a tape fabricated with a regular width may be cut into desired width and length and then used.

Figure 5:
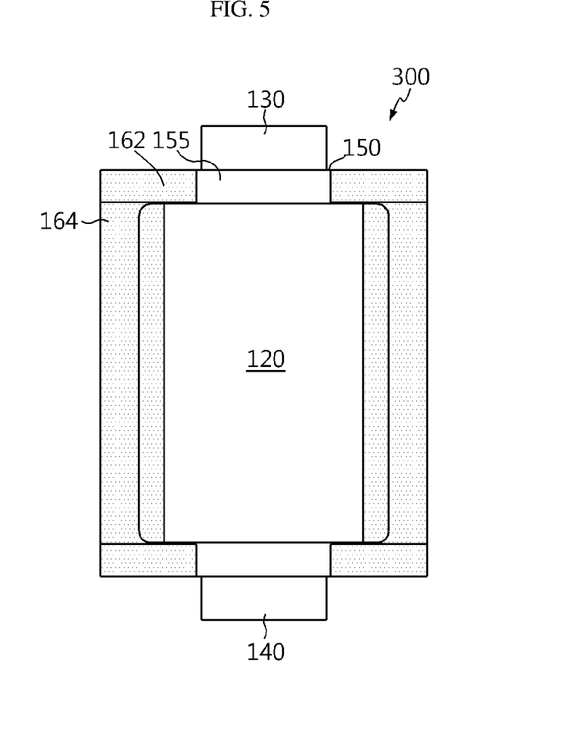
Figure 6:
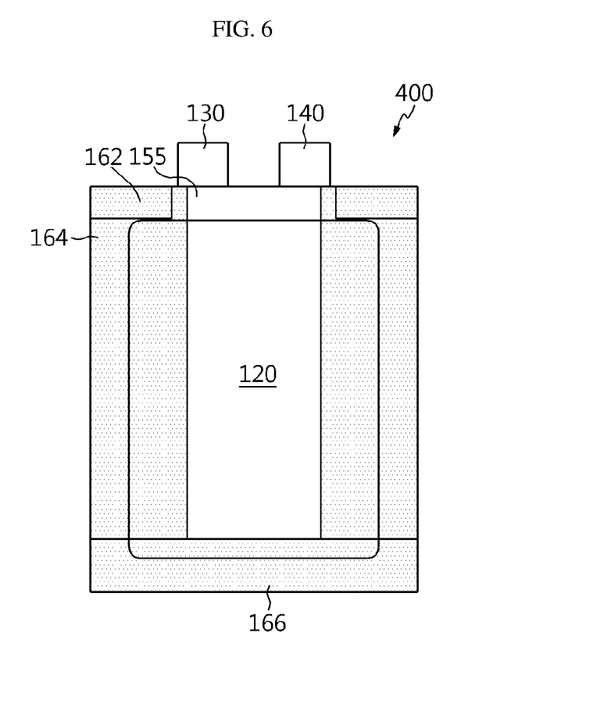

In the pouch-type secondary batteries 100, 200 depicted in FIGS. 2 and 4, the tape 160 is bonded to the sealing portion 155, but in the pouch-type secondary battery 300 depicted in FIG. 5, the tape 164 is formed to extend inwards further with a greater width than the sealing portion 155. The tape 164 may be bonded even to a region above the location of the electrode assembly 120 over the sealing portion 155. As a modification, the tape 162 may not be bonded to the sealing portions 155 at the upper and lower ends where the electrode leads 130, 140 protrude.

As shown in FIG. 6, the present disclosure may also be applied to a bidirectional pouch-type secondary battery 400.

In the pouch-type secondary battery 400, a positive electrode tab and a negative electrode tab protrude on the same surface on the basis of the electrode assembly 120. One ends of the electrode leads 130, 140 are attached to the electrode tabs, and the other ends thereof are exposed out of the battery case 150. In this case, a tape may also be bonded to the sealing portion. In the depicted example, a tape 164 is bonded to sealing portions 155 at both sides with a greater width than the sealing portions 155, a tape 162 is additionally bonded to a sealing portion 155 at an upper end where the electrode leads 130, 140 protrude, and a tape 166 is also additionally bonded to a sealing portion 155 at a lower end where the electrode leads 130, 140 do not protrude, with a greater width than the sealing portion 155. As a modification, it is also possible to provide a structure where only the tape 160 is formed, or only the tape 160 and the tape 162 are formed.

However, in addition to the above embodiments, the tapes 160, 162, 164, 166 may be provided in various ways. The tapes 160, 162, 164, 166 have the same role of blocking moisture or the like even though they are bonded at different locations with different widths, the tape 160 will be described representatively.

Figure 7:
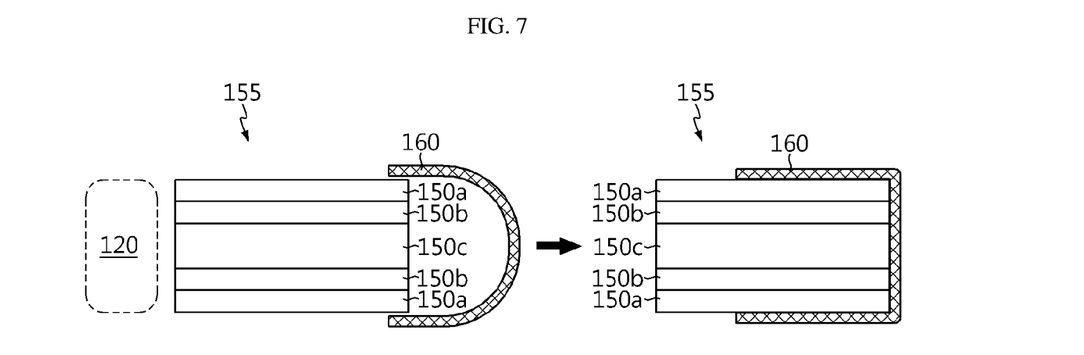
FIG. 7 is a diagram for illustrating a tape on the basis of a portion corresponding to a VII-VII' section of FIG. 2, as an example.

FIG. 7 is a diagram for illustrating a tape on the basis of a portion corresponding to a VII-VII' section of FIG. 2, as an example.

The battery case 150 is composed of an upper sheet and a lower sheet. Each sheet is composed of an outer resin layer 150*a*, a metal layer 150*b* and an inner resin layer 150*c*. As a result of sealing by thermal compression, the sealing portion 155 has a structure as depicted in FIG. 7, which includes an outer resin layer 150*a*, a metal layer 150*b*, an inner resin layer 150*c*, a metal layer 150*b* and an outer resin layer 150*a*. Even though the terminal of the sealing portion 155 is exposed in an existing technique, in the present disclosure, the tape 160 is bonded to the terminal of the sealing portion 155. As shown in the figures, the tape 160 covers a surface of the upper sheet and a surface of the lower sheet so that the terminal of the sealing portion 155 is not exposed out. The tape 160 includes a metal foil, which may be made of the same material of the metal layer 150*b* of the battery case 150 in view of material compatibility, and thus the tape 160 may be formed with an aluminum foil.

Figure 8:
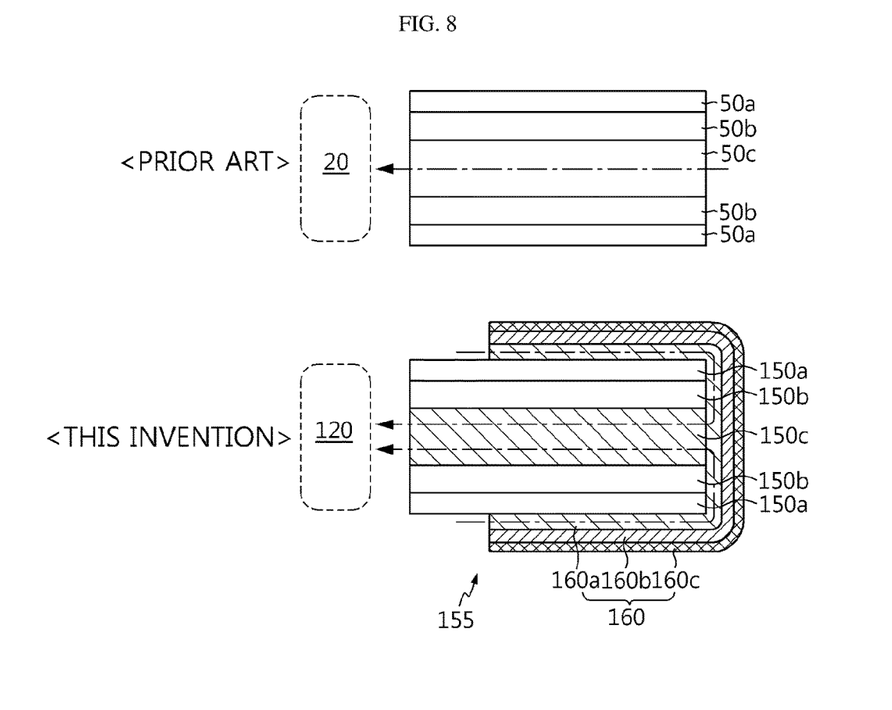
FIG. 8 is a diagram for illustrating that a moisture penetration path increases according to the present disclosure.

FIG. 8 shows a preferred example of the tape 160 according to the present disclosure in more detail.

The tape 160 is composed of an adhesive layer 160*a* and a metal foil layer 160*b*, and further includes an insulation layer 160*c* on the metal foil layer 160*b*. The insulation layer 160*c* may contain at least one kind of polymer selected from the group consisting of PET, nylon, polyethylene and polypropylene, and may not be used. The polymer is not limited to the above, and resins capable of sealing the terminal of the pouch sealing portion 155 may be used without limitation.

The adhesive layer 160*a* may have a thickness of 5 to 100 um, and the metal foil layer 160*b* may have a thickness of 5 to 100 um. The thicknesses of the adhesive layer 160*a* and the metal foil layer 160*b* are smaller than the above, sufficient effects are not obtained, and the thicknesses greater than the above are not practical in consideration of weight, thickness, operations and price of the battery.

The adhesive layer 160*a* may include 1 to 10% by mass of moisture-absorbing material. The moisture-absorbing material may include at least one of calcium chloride, alumina and zeolite. However, the present disclosure is not limited to such specific kinds of moisture-absorbing material, and any material capable of absorbing moisture may be adopted as the moisture-absorbing material of the present disclosure.

Preferably, the adhesive layer 160*a* may be formed in a state where the moisture-absorbing material is dispersed in a polymer material. For example, the adhesive layer 160*a* may be formed so that moisture-absorbing material powder is dispersed in a polymer material.

More preferably, the polymer material included in the adhesive layer 160*a* may be a polyolefin material. In particular, the adhesive layer 160*a* may be formed so that moisture-absorbing material powder is dispersed in polypropylene such as CPP. The inner resin layer 150*c* of the battery case 150 may be formed with polypropylene to ensure an adhesive property. If the polymer material of the adhesive layer 160*a* is formed with polypropylene, the adhesive layer 160*a* may be easily bonded to the inner resin layer 150*c* of the battery case 150.

As described above, in the present disclosure, the tape 160 is bonded to the sealing portion 155 so that the terminal of the sealing portion 155 is not exposed out. Accordingly, introduction of impurities such as external air, moisture or the like is blocked, and thus each edge portion is not degraded. Since the insulation property of the sealing portion 155 is ensured, the secondary battery according to the present disclosure has excellent insulation characteristics.

Meanwhile, in the present disclosure, the tape 160 directly blocks moisture, and it is also possible to delay or prevent degradation of the secondary battery by increasing a moisture penetration path. Moisture does not easily penetrate through the metal foil layer 160*b* of the tape 160. Moisture is highly likely to penetrate through the adhesive layer 160*a* of the tape 160. In the secondary battery according to the present disclosure, as indicated by a dot-dash arrow, moisture penetrates through the adhesive layer 160*a* at an exposed surface of the tape 160 and moves toward the electrode assembly 120 through the inner resin layer 150*c* of the sealing portion 155.

However, in a secondary battery according to an existing technique, a terminal of the sealing portion configured to include an outer resin layer 50*a*, a metal layer 50*b*, an inner resin layer 50*c*, a metal layer 50*b* and an outer resin layer 50*a* as described above is exposed out directly, and moisture penetrates through the exposed inner resin layer 50*c* in a very short path along a dot-dash arrow and gives a direct influence on the electrode assembly 20.

Figure 9:
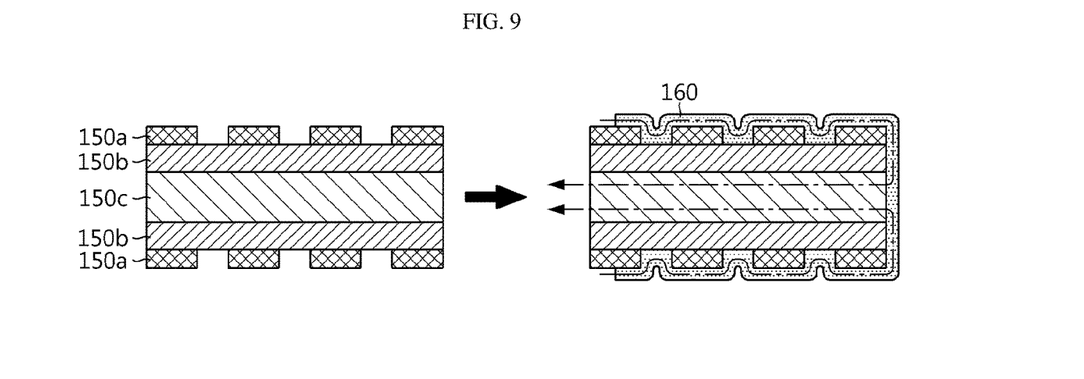
FIG. 9 is a diagram for illustrating that a moisture penetration path increases further according to another embodiment of the present disclosure.

FIG. 9 is a diagram for illustrating that a moisture penetration path increases further according to another embodiment of the present disclosure. In particular, FIG. 9 exemplarily shows a portion of the pouch-type secondary battery corresponding to a section VII-VII' of FIG. 2.

The battery case is composed of an upper sheet and a lower sheet. Each sheet is composed of an outer resin layer 150*a*, a metal layer 150*b* and an inner resin layer 150*c*. As a result of sealing by thermal compression, the sealing portion 155 has a structure as depicted in FIG. 9, which includes an outer resin layer 150*a*, a metal layer 150*b*, an inner resin layer 150*c*, a metal layer 150*b* and an outer resin layer 150*a*.

At this time, the outer resin layer 150*a* is patterned in the sealing portion 155. In addition, the tape 160 is bonded while filling an unevenness of the outer resin layer 150*a*.

In this configuration, if moisture penetrates through the tape 160 as indicated by a dot-dash arrow in the figure, a moisture penetration path is elongated along the unevenness of the outer resin layer 150*a* so that moisture may not be easily reach the inner resin layer 150*c* at the inside, thereby ensuring strong resistance against moisture.

The pattern may be shaped in parallel to a terminal of the pouch, namely a terminal of the sealing portion, to ensure best effects (a section of the terminal of the pouch depicted in FIG. 9 corresponds thereto). For example, if the outer resin layer 150*a* is patterned in the pouch-type secondary battery 100 as shown in FIG. 2, the outer resin layer 150*a* has several patterns parallel to the vertical direction of the pouch, at the sealing portions 155 of both sides where the electrode leads 130, 140 are not formed, in the pouch-type secondary battery 100, thereby forming the section as shown in FIG. 9. In addition to the above, a waved pattern, a combed pattern or the like may also be used.

The depth of the pattern of the outer resin layer 150*a* may be changed variously. For example, in this embodiment, the outer resin layer 150*a* is patterned through its entire thickness so that the metal layer 150*b* provided therebelow is exposed. However, the depth of the pattern of the outer resin layer 150*a* may be set to be 20% to 100% of the thickness of the outer resin layer 150*a*. If the depth of the pattern is smaller than the above range, the effect obtained by elongating the moisture penetration path may not be ensured.

The outer resin layer 150a may be patterned as follows. First, patterning may be performed at an initial pouch fabricating state. In other words, a battery case with patterned upper and lower sheets may be used. In addition, while the sealing portion is formed, a pattern may be formed during thermal bonding. Also, a pattern may be formed after the thermal bonding.

For example, during a sealing process for forming the sealing portion, a press having an unevenness may be used for pressing and bonding, so that the outer resin layer 150a may be patterned together with sealing.

As another example, when the outer resin layer 150a is patterned, wet etching or dry etching using an etchant capable of fusing polymer may be employed, or a laser beam may be used to burn polymer and thus form a pattern. At wet etching or dry etching, a mask exposing a portion of the outer resin layer 150a to be removed may be used. If a laser beam is used, only a desired portion of the outer resin layer 150a may be burned and removed by scanning the laser beam.

A width of a region of the outer resin layer 150a removed by patterning, namely a distance between the patterns, may be set to be 1.5 to 50 times of the thickness of the tape 160. When the distance between the patterns is in the above range with respect to the thickness of the tape 160, the moisture penetration path elongated by patterning may give sufficient effects, and the tape 160 may be formed conformal along the pattern while filling gaps in the pattern.

As more patterns are formed per unit length, a moisture penetration distance is more elongated, and thus it is advantageous for reducing moisture penetration to design the tape 160 with a smaller thickness and thus form more patterns. As described in the above embodiments, the tape 160 may be composed of an adhesive layer, a metal foil layer and an insulation layer, and if the outer resin layer 150a is patterned and applied as in this embodiment, the metal foil layer may have a thickness of 5 um to 20 um, and the adhesive layer and the insulation layer may respectively have a thickness of 5 um to 30 um, so that the tape 160 has a smaller thickness. In addition, the crystallinity of polymers of the tape 160 may be 30% or below so that the tape 160 may be easily bonded along the pattern.

A method for manufacturing this secondary battery is substantially identical to Steps s1 to s3 as described above, but a step of patterning the outer resin layer 150a to the sealing portion 155 is further included before the step of bonding the tape 160.

After the tape 160 is bonded, an additional treatment may be performed so that the tape 160 may fills the unevenness between the patterns agreeably.

As a first example of the additional treatment, a bonding portion of the tape 160 may be pressed.

The pressing may be performed using a tool (or, a press) having a temperature in the range of a room temperature and 80° C. A surface of the press, namely a surface contacting the tape 160, may be a planar surface or a surface having an unevenness corresponding to the pattern of the outer resin layer 150a. For example, a press having an uneven surface with a convex portion at a region corresponding to a valley between the patterns of the outer resin layer 150a and a concave portion at a region corresponding to the patterns may helpfully allow the tape 160 to be pressed and bonded while easily filling the valley between the patterns of the outer resin layer 150a.

The press may be made of metal material or polymer with elasticity. The press may be made of metal in a region for mechanical durability and a material such as polymer at a surface contacting the tape 160. If the press is made of elastic material, the tape 160 may be bonded while more easily filling the valley between the patterns of the outer resin layer 150a.

A second example of the additional treatment is heating. If the adhesive layer or the insulation layer of the tape 160, particularly the adhesive layer, is made of a thermally shrinkable material and the tape 160 is heated by providing a hot air or the like after taping, the tape 160 is shrunken so that the tape 160 is thermally deformed to fill the valley between the patterns of the outer resin layer 150a more easily. The thermally shrinkable material may use a synthetic resin such as polypropylene, polyethylene, and polyvinyl chloride, which is greatly shrunken at a relative low temperature by means of short-time heating.

In addition, the features described above with reference to FIGS. 2 to 8 may be identically or similarly applied to this embodiment.

Figure 10:
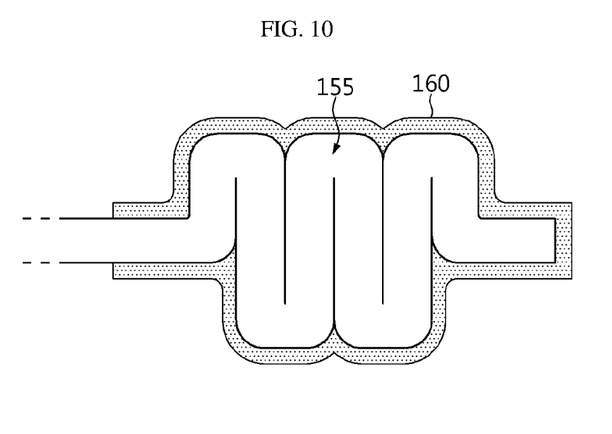
FIG. 10 shows a section of a sealing portion of a pouch-type secondary battery according to another embodiment of the present disclosure.

FIG. 10 shows a section of a sealing portion of a pouch-type secondary battery according to another embodiment of the present disclosure. FIG. 10 also exemplarily shows a portion of the pouch-type secondary battery corresponding to the section VII-VII' of FIG. 2.

In the example depicted in FIG. 10, the sealing portion 155 is repeatedly bent, and the tape 160 is bonded thereon. In this case, a path through which moisture penetrates is also increased.

A method for manufacturing this secondary battery is substantially identical to Steps s1 to s3 as described above, but a step of repeatedly bending the sealing portion 155 is further included before the step of bonding the tape 160.

As described above, a moisture penetration path from the outside is elongated by bonding a tape to the terminal of the sealing portion, thereby preventing the electrode assembly from being degraded due to moisture and also effectively blocking a leakage of an electrolyte in the secondary battery. Therefore, it is possible to manufacture a battery which is excellent in a capacity retention rate and a resistance increase rate.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:
1. A method for manufacturing a pouch-type secondary battery, comprising:
   providing an electrode assembly to which electrode leads of a positive electrode and a negative electrode are connected;
   mounting the electrode assembly in a pouch-type battery case and bonding an upper sheet and a lower sheet of the battery case to each other along an outer circumference of the battery case so that the electrode leads protrude outwards, thereby forming a sealing portion; and
   bonding a tape having a metal foil and an adhesive layer to the battery case to cover a surface of the upper sheet of the battery case and a surface of the lower sheet of the battery case so that a terminal of the sealing portion is not exposed, wherein the upper sheet and the lower sheet are respectively composed of an outer resin layer, a metal layer and an inner resin layer, and the outer resin layer has patterns in the sealing portion in parallel to the terminal of the sealing portion, wherein the tape conforms along the pattern of the outer resin layer, and wherein the step of patterning the outer resin layer is performed by melting the outer resin layer while the sealing portion is being formed.

2. The method for manufacturing a pouch-type secondary battery according to claim 1, wherein the outer resin layer is bonded while being pressed using a press having an unevenness when the sealing portion is formed, so that the outer resin layer is sealed and patterned simultaneously.

3. The method for manufacturing a pouch-type secondary battery according to claim 1, further comprising:

pressing a portion where the tape is bonded, after the tape is bonded.

4. The method for manufacturing a pouch-type secondary battery according to claim 3, wherein the press has a temperature in the range of room temperature to 80° C.

5. The method for manufacturing a pouch-type secondary battery according to claim 1, wherein a moisture penetrates through the adhesive layer at an exposed surface of the tape and moves toward the electrode assembly through the inner resin layer of the sealing portion, and the moisture penetration path is elongated along the patterns of the outer resin layer.

6. A method for manufacturing a pouch-type secondary battery, comprising:

providing an electrode assembly to which electrode leads of a positive electrode and a negative electrode are connected;

mounting the electrode assembly in a pouch-type battery case and bonding an upper sheet and a lower sheet of the battery case to each other along an outer circumference of the battery case so that the electrode leads protrude outwards, thereby forming a sealing portion; and bonding a tape having a metal foil and an adhesive layer to the battery case to cover a surface of the upper sheet of the battery case and a surface of the lower sheet of the battery case so that a terminal of the sealing portion is not exposed, wherein the upper sheet and the lower sheet are respectively composed of an outer resin layer, a metal layer and an inner resin layer, and the outer resin layer has patterns in the sealing portion in parallel to the terminal of the sealing portion, wherein the tape conforms along the pattern of the outer resin layer, wherein the outer resin layer is patterned after the sealing portion is formed, and wherein the outer resin layer is patterned by performing wet etching or dry etching using an etchant capable of fusing a polymer of the outer resin layer or by burning the polymer with a laser beam.

7. The method for manufacturing a pouch-type secondary battery according to claim 6, wherein the tape is bonded while filling an unevenness between the patterns in the outer resin layer.

8. The method for manufacturing a pouch-type secondary battery according to claim 6, further comprising:

performing an additional treatment including pressing or heating the tape so that the tape fills an unevenness between patterns of the outer resin layer, after the tape is bonded.

9. The method for manufacturing a pouch-type secondary battery according to claim 6, wherein a moisture penetrates through the adhesive layer at an exposed surface of the tape and moves toward the electrode assembly through the inner resin layer of the sealing portion, and the moisture penetration path is elongated along the patterns of the outer resin layer.

10. A method for manufacturing a pouch-type secondary battery, comprising:

providing an electrode assembly to which electrode leads of a positive electrode and a negative electrode are connected;

mounting the electrode assembly in a pouch-type battery case and bonding an upper sheet and a lower sheet of the battery case to each other along an outer circumference of the battery case so that the electrode leads protrude outwards, thereby forming a sealing portion;

bonding a tape having a metal foil and an adhesive layer to the battery case to cover a surface of the upper sheet of the battery case and a surface of the lower sheet of the battery case so that a terminal of the sealing portion is not exposed; and pressing a portion where the tape is bonded, after the tape is bonded, wherein the upper sheet and the lower sheet are respectively composed of an outer resin layer, a metal layer and an inner resin layer, and the outer resin layer has patterns in the sealing portion in parallel to the terminal of the sealing portion, wherein the tape conforms along the pattern of the outer resin layer, and wherein a surface of a press which comes into contact with the tape is an uneven surface having a convex portion in a region corresponding to a valley between patterns of the outer resin layer and a concave portion in a region corresponding to a pattern of the outer resin layer.

11. The method for manufacturing a pouch-type secondary battery according to claim 10, wherein the outer resin layer is patterned after the sealing portion is formed.

12. The method for manufacturing a pouch-type secondary battery according to claim 10, after bonding the tape, further comprising:

heating the portion where the tape is bonded.

13. The method for manufacturing a pouch-type secondary battery according to claim 10, wherein a moisture penetrates through the adhesive layer at an exposed surface of the tape and moves toward the electrode assembly through the inner resin layer of the sealing portion, and the moisture penetration path is elongated along the patterns of the outer resin layer.

* * * * *